United States Patent [19]

Shibaoka et al.

[11] Patent Number: 4,891,055
[45] Date of Patent: Jan. 2, 1990

[54] METHOD OF FORMING GLASS PRODUCT HAVING SMOOTH SURFACE

[75] Inventors: Kazuo Shibaoka, Itami; Takao Miwa; Toshio Akimoto, both of Yokkaichi; Noriaki Eto, Itami, all of Japan

[73] Assignee: Nippon Sheet Glass Co., Ltd., Osaka, Japan

[21] Appl. No.: 267,161

[22] Filed: Nov. 4, 1988

[30] Foreign Application Priority Data

Nov. 6, 1987 [JP] Japan .................. 62-280374
Nov. 6, 1987 [JP] Japan .................. 62-280375

[51] Int. Cl.[4] .............................................. C03B 23/03
[52] U.S. Cl. ........................................ 65/106; 65/104; 65/107
[58] Field of Search ..................... 65/104, 106, 107

[56] References Cited

U.S. PATENT DOCUMENTS 2,817,928 12/1957 Lambert et al. .................... 65/106
3,819,349 6/1974 Shimizu et al. ................. 65/106 X

FOREIGN PATENT DOCUMENTS 0142697 8/1951 Australia ............................. 65/107
0591648 8/1947 United Kingdom ............ 65/107
1374449 11/1974 United Kingdom ............ 65/107

Primary Examiner—Arthur Kellogg
Attorney, Agent, or Firm—Saidman, Sterne, Kessler & Goldstein

[57] ABSTRACT

In a method of forming a glass product having a smooth surface according to this invention, a glass plate is placed on a male mold which is formed to have dimensions corresponding to the inner dimensions of the glass product and contacts its inner peripheral edge portion, an outer peripheral portion to be deformed of the glass plate is heated to a temperature higher than that of a central portion, serving as the smooth surface, of the glass plate so as to be deformed on the male mold by its weight, and the deformed glass plate is pressed by a female mold formed to have dimensions corresponding to the outer dimensions of the glass product.

6 Claims, 5 Drawing Sheets

METHOD OF FORMING GLASS PRODUCT HAVING SMOOTH SURFACE

BACKGROUND OF THE INVENTION

1. Field of the Invention

The present invention relates to a method of forming a glass product having a smooth surface and, more particularly, to a method of forming a deep-draw glass product partially having a smooth surface such as a display front panel of a low-profile television.

2. Description of the Prior Art

In a method of forming a front panel of a cathode-ray tube, a molten glass gob is press-molded to a predetermined shape, and a portion required to have a smooth surface of the molded piece is polished. Alternatively, a glass plate is placed and heated on a mold, and is then subjected to vacuum forming.

However, of these conventional methods, in a method of press-molding a gob, since a molten glass gob is pressed against the surface of a mold upon molding using the mold, impressions remain on the surface of a glass product. For this reason, a portion required to have a smooth surface must be polished after molding. As a result, the number of steps is increased, productivity is impaired, and cost is increased.

In a vacuum forming method, since a force contributing to deformation of a glass plate is only a vacuum force, a portion to be deformed of the glass plate must be kept at a high temperature. When vacuum forming is performed in such a state, the thickness of the portion to be deformed at a high temperature is considerably decreased. In addition, impressions due to contact with a mold are formed on a glass plate portion near the portion to be deformed.

In the vacuum forming method, or in a method wherein a glass plate is molded while being clamped between male and female molds, when a glass plate is placed and heated on the female mold, a flat portion of the glass plate is inevitably deflected due to its weight.

On the other hand, in a method wherein a glass plate is clamped between male and female molds to heat and mold it, a sharing force always acts on the glass plate. For this reason, if deep drawing is performed, a glass plate portion defining a side surface is expanded, and its thickness is decreased, thus posing a problem of mechanical strength. Therefore, this method can only be applied to molding of small products such as a fluorescent tube.

As a problem common to these methods wherein a glass plate is re-heated and molded, thermal cracking during cooling or deflection after cooling easily occurs due to temperature nonuniformity at the beginning of cooling. In order to solve this problem, when a glass plate is entirely heated to the same temperature as that of a portion to be deformed, the entire surface of the molded piece suffers from deflection or impressions due to heat.

SUMMARY OF THE INVENTION

The present invention has been made to solve the above problems, and has as its object to provide a molding method capable of efficiently forming a deep-draw piece which has a high flatness and free from impressions at low cost without decreasing a thickness.

In order to achieve the above object, there is provided a method of forming a glass product having a smooth surface, wherein a glass plate is placed on a male mold which is formed to have dimensions corresponding to the inner dimensions of the glass product and contacts its inner peripheral edge portion, an outer peripheral portion to be deformed of the glass plate is heated to a temperature higher than that of a central portion, serving as a smooth surface, of the glass plate so as to be deformed on the male mold by its weight, and the deformed glass plate is pressed by a female mold formed to have dimensions corresponding to the outer dimensions of the glass product.

According to the present invention, when a large-scale glass product is to be formed, necessary portions of the male mold can be supported by an inner support contacting the central portion of the glass plate by a width of 2 mm or less.

According to the method of the present invention, a portion constituting a side wall of a glass plate is deflected in advance by its weight while a portion constituting the smooth surface is relatively kept at a low temperature, and thereafter, the glass plate is pressed using the female and male molds to adjust its shape. Thus, a decrease in thickness due to extension upon molding of the side wall can be prevented, and a deep-draw piece having a smooth surface of high flatness free from impressions can be effectively formed using a glass plate.

DETAILED DESCRIPTION OF THE PREFERRED EMBODIMENTS

Figure 1:
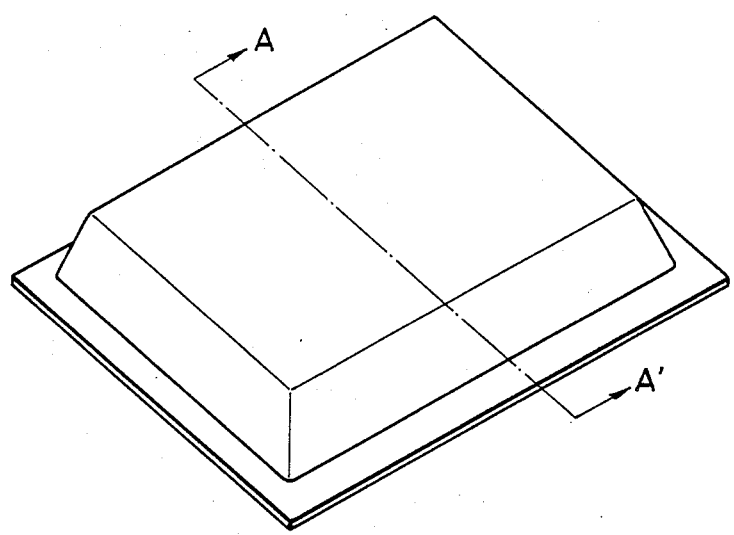
FIG. 1 is a perspective view of a deep-draw glass product.

First and second embodiments of the present invention will be described hereinafter with reference to the accompanying drawings. FIGS. 1 to 7 show details of the first and second embodiments. But, prior to description of details of the first and second embodiments, an outline of entire process common to the first and second embodiments will be described with reference to FIG. 8.

At first, a glass plate G is placed on a mold 11 attached to a support plate 10, and this support plate 10 is placed on a carriage 53 made of stainless steel. An inlet door 59 is opened, and the carriage 53 is entered into a furnace 51 heated by a heater 52. In a preliminarily heating room 61, the entire glass plate G is heated to a temperature equal to or higher than a temperature lower than a distortion point by about 100° C.

Subsequently, the carriage 53 is moved by rollers 54 to a locally heating room 62 wherein a locally heating body 65 is suspended by support shafts 57 from a ceiling of the furnace 51. The locally heating body 65 is composed of a brick 55 wherein a heater 56 is embedded. In the locally heating room 62, an outer peripheral portion E of the glass plate G is heated to a temperature higher than that of a central portion C of the glass plate G. As a result, the outer peripheral portion E is deformed by its weight.

Subsequently, the carriage 53 is moved by rollers 54 to a press room 63. In this press room 63, the carriage 53 is risen by a press machine 58 and the glass plate G is pressed to a female mold 13 made of stainless steel and is molded to a predetermined form.

Subsequently, the carriage 53 is descended to rollers 54 and is moved to a cooling room 64. Then, the glass plate G is gradually cooled. At last, an outlet door 60 is opened and the carriage 53 is brought out from the furnace 51.

Figure 2:
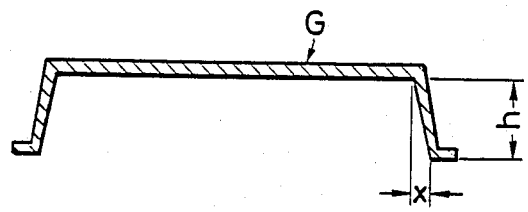
FIG. 2 is a sectional view taken along a line A-A' in FIG. 1.
Figure 3:
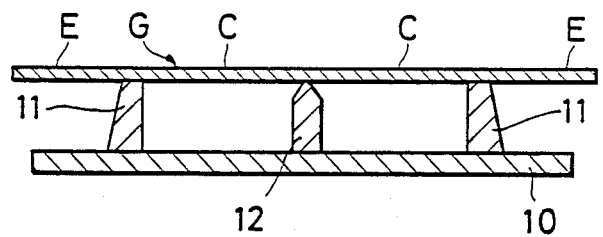
FIG. 3 is a cross-sectional view showing a state wherein a glass plate is placed on a male mold used in a first embodiment of the present invention.

FIGS. 1 to 4 show the first embodiment. FIG. 1 shows an outer appearance of a molded piece formed according to the first embodiment, and FIG. 2 is a sectional view taken along a line A—A' in FIG. 1. In order to form a deep-draw piece from a glass plate, a glass plate G is placed on a mold 11 attached to a support plate 10 shown in FIG. 3, and the entire glass plate G is heated to a temperature equal to or higher than a temperature lower than a distortion point by about 100° C. In this case, the mold 11 may be formed to have dimensions corresponding to the inner dimensions of the molded piece, or a support member having similar dimensions may be used and the glass plate G may be transferred to a regular mold 11 before press-molding.

An outer peripheral portion E to be deformed of the glass plate G is heated to a temperature equal to or higher than a temperature (about 740° C. for soda lime silica glass) corresponding to a viscosity indication (log $\eta$, $\eta$ is the poise) of 7.5. A portion C constituting a smooth surface of a molded piece is selectively heated to a temperature corresponding to a viscosity indication of 14.5 (about 492° C.) or less and preferably falling within the range of 13.5 (about 530° C.) or less and 12.4 (about 560° C.) or more.

If the temperature of the portion C constituting the smooth surface is equal to or lower than a temperature corresponding to a viscosity indication of 7.5, the glass plate G may crack or may be broken upon press-molding, and satisfactory molding may sometimes be disturbed. If the temperature of the portion C constituting the smooth surface is equal to or higher than a temperature corresponding to a viscosity indication of 12.4, the glass plate G may be a clear smooth surface. In order to prevent any impressions from remaining on the glass surface, the portion C is preferably kept at a temperature equal to or lower than a temperature corresponding to a viscosity indication of 13.5.

In order to prevent deflection during heating of the glass plate G, it is effective to provide an inner support 12 for supporting the glass plate G in the mold 11 particularly when the glass plate G is large. If there is no inner support 12, a support interval of the glass plate G is prolonged. For this reason, if a temperature increasing speed of local heating is low, deflection easily occurs as the temperature of the glass plate G increases.

In this case, a portion of the inner support 12 contacting the glass plate G must have a width of 2 mm or less and preferably 1 mm or less. If the width of the inner support 12 is larger than 2 mm, when the glass plate G at a room temperature is placed on the mold 11, the glass plate G is locally and immediately heated by the pre-heated inner support 12, and thermal cracking may occur due to a temperature difference with the non-heated portion.

Figure 4:
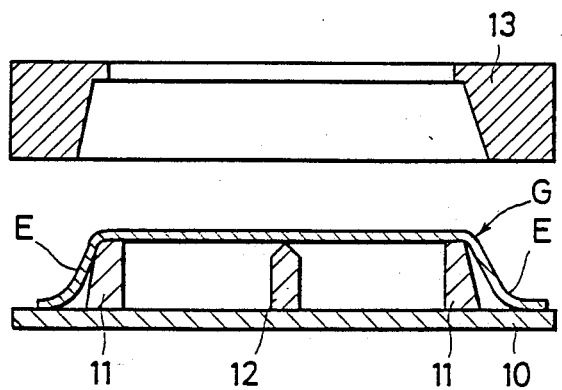
FIG. 4 is a cross-sectional view of a female mold and a glass plate which is heated and deformed by its weight on the male mold shown in FIG. 3.

The glass plate G whose portion E to be deformed is locally heated is deformed by its weight, as shown in FIG. 4. In this case, the thickness of the portion to be deformed of the glass plate G is not almost changed. In this case, the glass plate G is pressed using a female mold 13 and a male mold assembly (10 and 11), so that the portion E to be deformed of the glass plate G, which was pre-heated to a temperature suitable for molding, is easily deformed, and a deep-draw glass product can be formed without causing a problem of a decrease in thickness upon expansion of the side wall during molding.

If the glass product thus formed is directly cooled, since there is a large temperature difference exceeding 100° C. between the outer peripheral portion E and the inner portion C of the glass plate G, warp occurs when it is cooled to a room temperature or the piece may be broken due to a residual distortion during cooling. For this reason, in the method of the first embodiment, a temperature difference inside the glass molded piece G is decreased below 30° C. while keeping the glass molded piece G at a temperature higher than the distortion point of the glass (a temperature equal to or higher than a temperature corresponding to a viscosity indication of 14.5). In this case, in order to reduce a residual distortion in the glass product, the glass temperature is preferably set at a temperature (falling within the range of 530° C. to 560° C. for soda lime silica glass) corresponding to a viscosity indication falling within the range of 13.5 and 12.4. If a temperature difference is to be decreased at a temperature below the distortion point, no effect of reducing the residual distortion can be obtained. On the other hand, at a high temperature corresponding to a viscosity indication of 12.4 or less, glass is easily deformed. If a temperature difference is larger than 30° C., warp left in the molded piece G is considerable, and it is not suitable for a high-precision molded piece G.

With the method of the first embodiment, almost no decrease in thickness of the side wall occurred, and a thickness of the side wall of 85% or more of an original thickness of the glass plate could be maintained, that was impossible in a conventional method wherein a glass was set and heated between male and female molds and in a vacuum forming method. In addition, deep drawing of 20 mm or more or four times the original thickness of the glass plate could be performed.

In this case, the characteristic feature of the first embodiment is most typically exhibited when a sharp molded piece having a ratio h/x of an overhang (x) from a smooth surface of a side surface (FIG. 2) to an inner surface thickness (h) is 1.5 or more and normally, 4.5 or more is to be formed.

The present inventors formed a molded piece G having a 290×218 (mm) flat surface, and a ratio (h/x) =5.67 of an 80-mm inner-surface height (h) to an overhang of a side surface according to the above-mentioned method using a 4-mm thick float glass plate, thus obtaining a molded piece G. The thickness of the side surface of the molded piece G was about 3.7 mm and its ratio to that of an original plate was 0.9 or more. The smooth surface of the molded piece G was free from impressions and had a warp amount of only about 100 μm. The warp amount was decreased to ⅓ that formed when no inner support 12 was provided. In a molded piece G having a 930×610 (mm) smooth surface portion C, an inner surface height (h) of 44 mm, and a ratio (h/x) of 1.5, the thickness of the side surface was 3.8 (a ratio to an original plate was 0.95) or more, and a warp amount was 500 μm or less.

As described above, according to the method of the first embodiment, a high-flatness three-dimensional glass molded piece G can be formed from the glass plate G without causing a decrease in thickness of the side wall. Thus, a glass molded piece G having a sufficient mechanical strength suitable for a chamber for a lightweight, low-profile television can be obtained.

Figure 5:
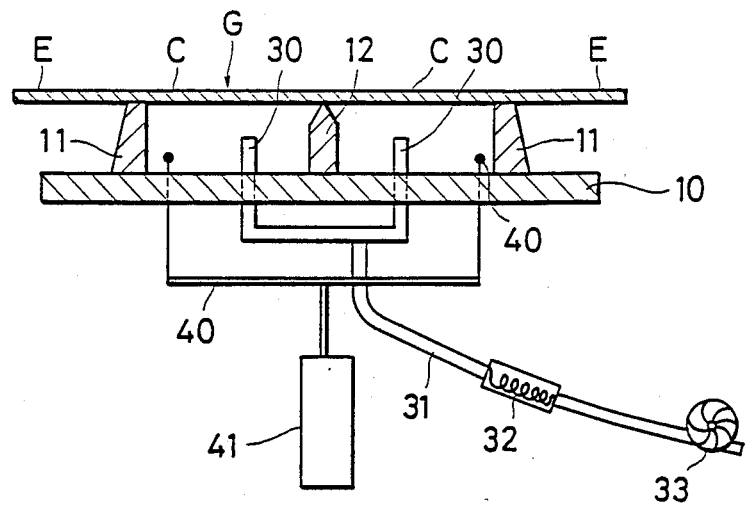
FIG. 5 is a cross-sectional view showing a state wherein a glass plate is placed on a male mold used in a second embodiment of the present invention.
Figure 6:
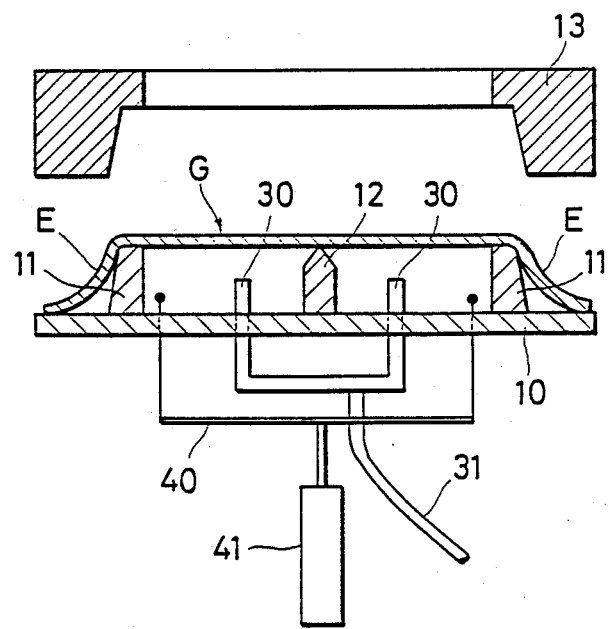
FIG. 6 is a cross-sectional view of a female mold and a glass plate which is heated and deformed by its weight on the male mold shown in FIG. 5.
Figure 7:
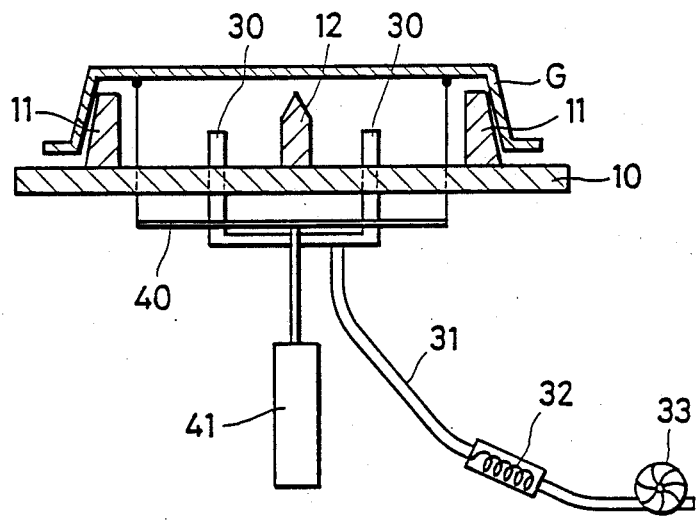
FIG. 7 is a cross-sectional view showing a state wherein a glass molded piece is supported above the mold shown in FIG. 5 in a floating state.
Figure 8:
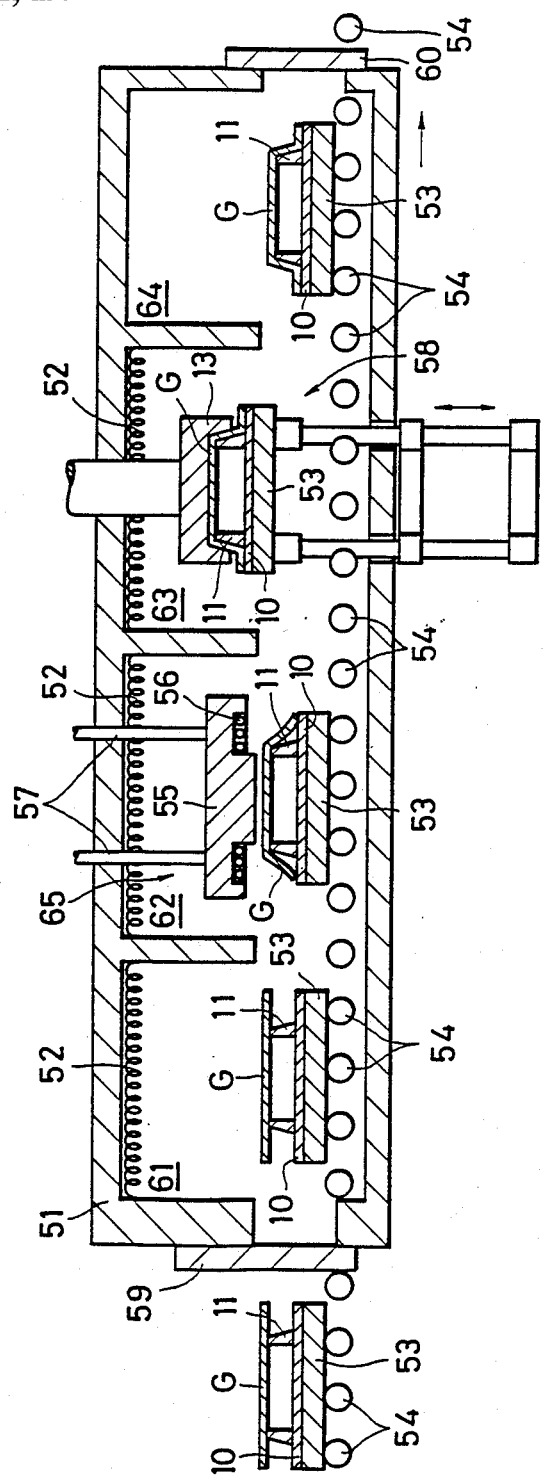
FIG. 8 is a schematic cross-sectional view of an entire apparatus which is used in the first and second embodiments of the present invention in common.

FIGS. 5 to 7 show a second embodiment of the present invention. The second embodiment is made to obtain the glass molded piece G illustrated in FIGS. 1 and 2. As shown in FIGS. 5 and 6, following the same procedures as in the first embodiment, a portion E to be deformed of a glass plate G is locally heated and is deformed by its weight. In this state, the glass plate G is pressed and molded by a female mold 13 and a male mold assembly (10 and 11).

In the method of the second embodiment, upon cooling of the glass molded piece G, in order to prevent temperature nonuniformity due to differences in heat capacity and heat conductivity of the glass mold assembly (10 and 11), a glass support member indicated by reference numeral 40 in FIG. 7 is moved upward by a known means such as an air cylinder 41 to be floated from the mold assembly (10 and 11). Then, hot air at a temperature (about 530° to 560° C. or less for soda lime silica glass) corresponding to a viscosity indication of glass falling within the range of 13.5 to 12.4 is blown on the glass surface at a flow rate falling within the range of 30 l/min.m² to 120 l/min.m² from a hot-air outlet port 30 communicating with a heater 32 having a fan 33 and a temperature controller (not shown) through a conduit 31, thus uniforming the temperature of the molded piece G. In this case, if a hot-air temperature is lower than a temperature (530° C. for the above glass) corresponding to a viscosity indication of 13.5, when the hot air is blown, a residual distortion is undesirably formed in the glass. If the hot-air temperature exceeds a temperature (560° C. for the above glass) corresponding to a viscosity indication of 12.4, a glass temperature is increased during a temperature uniforming process, and warp may undesirably occur.

If a flow rate is smaller than 30 l/min.m², it takes a long time to uniform a temperature. If the flow rate exceeds 120 l/min.m², a large air pressure acts on the glass, and it is not preferable for a high-flatness molded piece G. Note that hot air can be blown to both the surfaces of the molded piece G. In this case, a flow rate can be increased if upper and lower balances are precisely adjusted. A hot-air blowing period is determined depending on a temperature distribution of glass. Normally, the temperature of the entire glass product can be uniformed within 1 to 2 minutes.

Thereafter, the entire molded piece G is gradually or uniformly cooled to obtain a glass product. With this method, a temperature difference inside the glass molded piece G is decreased to 30° C. or less while keeping the glass molded piece G at a temperature corresponding to a distortion point or higher of the glass (at a temperature equal to or higher than a temperature corresponding to a viscosity indication of 14.5), and the temperature of the glass product can be increased to a temperature (falling within the range of 530° C. to 560° C. for soda lime silica glass) corresponding to a viscosity indication falling within the range of 1.35 to 12.4. If a temperature difference is to be decreased at a temperature below the distortion point, no effect of reducing the residual distortion can be obtained. On the other hand, at a high temperature corresponding to a viscosity indication of 12.4 or less, glass is easily deformed, and processes are complicated. If a temperature difference is larger than 30° C., warp left in the molded piece G is considerable, and it is not suitable for a high-precision molded piece G.

According to the method of the second embodiment, almost no decrease in thickness of the side wall occurs, and a deep-draw piece can be formed, which cannot be formed in a conventional method wherein a glass plate is set and heated between female and male molds and in a vacuum forming method.

The present inventors formed a molded piece G having a 290×218 (mm) flat surface, and a ratio (h/x) =5.67 of an 80-mm inner-surface height (h) to an overhang of a side surface according to the above-mentioned method using a 4-mm thick float glass plate. In a state wherein the temperature of the outer peripheral portion E of the molded piece G was about 700° C. and the temperature of the smooth surface portion C was about 540° C., hot air of a temperature of 530° C. was blown on the glass inner surface for about 2 minutes from the outlet port 30 at a rate of about 60 l/min.m². Thereafter, the molded piece G was placed on a cooling furnace and was uniformly cooled to a room temperature. The warp amount of the molded piece G thus obtained was about 100 μm or less. The thickness of the side surface was about 3.7 mm, and its ratio to that of the original plate was 0.9 or more. No impression was observed on the smooth surface of the molded piece G.

The present inventors also formed a molded piece G having a 930×610 (mm) smooth surface portion C, an inner surface height (h) of 44 mm, and a ratio (h/x) of 1.5. In a state wherein the temperature of the outer peripheral portion E of the molded piece G was about 700° C. and the temperature of the smooth surface portion C was about 510° C., hot air of a temperature of 550° C. was blown on the glass inner surface for about 1.5 minutes from the outlet port 30 at a rate of about 100 l/min.m², thus reducing a temperature difference in the surface to 10° C. or less. In this state, the entire piece was gradually cooled. The molded piece G thus obtained had a warp amount of 300 μm or less, and a thickness of the side surface of 3.8 mm or more (a ratio to an original plate was 0.95). In addition, no impression was observed.

As described above, according to the method of the second embodiment, a high-flatness glass molded piece G can be formed from a glass plate G without causing a decrease in thickness of the side wall, and no damage due to temperature nonuniformity inside the molded piece G immediately after molding does not occur.

What is claimed is:
1. A method of forming a glass product having a smooth surface comprising the steps of:
placing a glass plate on a male mold which is formed to have dimensions corresponding to the inner dimensions of the glass product and which contacts an inner peripheral edge portion thereof;

heating the central portion of the glass plate to a temperature corresponding to a viscosity indication (log $\eta$, $\eta$ is the poise) falling within a range of 14.5 and 11.5;

heating the outer peripheral portion to be deformed of the glass plate to a temperature equal to or higher than a temperature corresponding to a viscosity indication of 7.5, so that the outer peripheral portion of the glass plated is deformed on said male mold by the force of gravity;

pressing the deformed glass plate with a female mold formed to have dimensions corresponding to the outer dimensions of the glass product; and after formation of the glass product, during gradual cooling or at the beginning of cooling, setting the temperature of the central portion of the glass plate, which serves as the smooth surface of the glass product, to a temperature corresponding to a viscosity indication falling within a range of 14.5 and 12.4 so as to reduce a temperature difference in the glass molded piece to 30° C. or less.

2. A method according to claim 1, wherein after pressing, temperature-controlled hot air is blown to the glass product while the glass molded piece is floated above the male mold, thereby uniforming a temperature of the glass molded piece.

3. A method according to claim 2, wherein a temperature of the central portion of the glass plate upon press-molding is set at a temperature corresponding to a viscosity indication (log $\eta$, $\eta$ is the poise) falling within a range of 14.5 and 11.5, a temperature of the outer peripheral portion to be deformed of the glass plate is set at a temperature equal to or higher than a temperature corresponding to a viscosity indication of 7.5, and the temperature of the hot air is set at a temperature corresponding to a viscosity indication falling within a range of 13.5 and 12.4.

4. A method according to claim 3, wherein an amount of the hot air falls in a range of 30 l/min.m$^2$ and 120 l/min.m$^2$ with respect to a surface area of a molded piece.

5. A method according to claim 4, wherein after the temperature difference in the glass molded piece is decreased below 30° C., the glass molded piece is uniformly and gradually cooled or is cooled.

6. A method according to any one of claims 2, 5 or 1 wherein an inner support contacting the central portion of the glass plate is provided to a predetermined portion of the male mold, and a contact width of the inner support with the glass plate is set to be 2 mm or less.

* * * * *